(12) United States Patent
Wu

(10) Patent No.: US 11,228,717 B2
(45) Date of Patent: Jan. 18, 2022

(54) CONTROL METHOD AND ELECTRONIC DEVICE FOR CAPTURING IMAGES WITH MULTIPLE LENS

(71) Applicant: Chiun Mai Communication Systems, Inc., New Taipei (TW)

(72) Inventor: Kuo-Wei Wu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/857,564

(22) Filed: Apr. 24, 2020

(65) Prior Publication Data
US 2020/0358960 A1 Nov. 12, 2020

(30) Foreign Application Priority Data
May 10, 2019 (CN) .......................... 201910390065.4

(51) Int. Cl.
*H04N 5/232* (2006.01)
*G02B 21/02* (2006.01)
*G02B 13/06* (2006.01)
*G02B 7/02* (2021.01)
*G08B 21/02* (2006.01)

(52) U.S. Cl.
CPC ......... *H04N 5/23299* (2018.08); *G02B 7/021* (2013.01); *G02B 13/06* (2013.01); *G08B 21/02* (2013.01); *H04N 5/23238* (2013.01)

(58) Field of Classification Search
None
See application file for complete search history.

(56) References Cited

U.S. PATENT DOCUMENTS

| 10,277,813 | B1 * | 4/2019 | Thomas | H04N 5/23206 |
|---|---|---|---|---|
| 10,541,000 | B1 * | 1/2020 | Karakotsios | H04N 9/79 |
| 10,938,969 | B2 * | 3/2021 | Li | F16M 11/046 |
| 2015/0162048 | A1 * | 6/2015 | Hirata | G11B 20/10527 |
| | | | | 386/337 |
| 2016/0212339 | A1 * | 7/2016 | Schacht | H04N 5/23238 |
| 2018/0007276 | A1 * | 1/2018 | Ollila | H04N 7/18 |
| 2020/0081227 | A1 * | 3/2020 | Huang | H04N 5/2258 |
| 2020/0133422 | A1 * | 4/2020 | Maalouf | G06F 1/1626 |
| 2020/0177715 | A1 * | 6/2020 | Chen | G06F 1/1686 |
| 2020/0236295 | A1 * | 7/2020 | Yoshizawa | G06K 9/6267 |

FOREIGN PATENT DOCUMENTS

| CN | 105827934 A | 8/2016 |
|---|---|---|
| CN | 106297184 A | 1/2017 |

\* cited by examiner

*Primary Examiner* — Edemio Navas, Jr.
(74) *Attorney, Agent, or Firm* — ScienBiziP, P.C.

(57) ABSTRACT

A hand-held image-capturing electronic device with ability to compensate for unstable rotation and images during 360-degree panoramic captures includes a display screen, a first lens unit, a second lens unit, and a third lens unit. The first lens unit and the second lens unit are positioned on opposing surfaces, the third lens unit is independently rotatable on the electronic device and can cooperate with the first lens unit and the second lens unit to capture images which are refined and synthesized together by the device. A method for capturing such images with such device is also disclosed.

15 Claims, 3 Drawing Sheets

CONTROL METHOD AND ELECTRONIC DEVICE FOR CAPTURING IMAGES WITH MULTIPLE LENS

FIELD

The subject matter herein generally relates to image-capturing electronic devices, and in particular to a control method and an electronic device capable of realizing a multi-lens shooting mode.

BACKGROUND

Smartphones and tablets, etc. normally do not have a function of automatically taking 360-degrees panoramic photos, wherein panoramic photos are taken by rotating the device, and then take an approximate 180-degrees photo. During the rotation, the device may be shaken, thus, taking clear and focused panoramic photos can be difficult. Furthermore, because a moving object, such as people, an animal, or an object blown by the wind, that come within the image range of the device, some images or photos of the panoramic photo may be blurred.

Therefore, there is room for improvement within the art.

BRIEF DESCRIPTION OF THE DRAWINGS

Many aspects of the disclosure can be better understood with reference to the figure. The components in the figures are not necessarily drawn to scale, the emphasis instead being placed upon clearly illustrating the principles of the disclosure.

DETAILED DESCRIPTION

Figure 1:
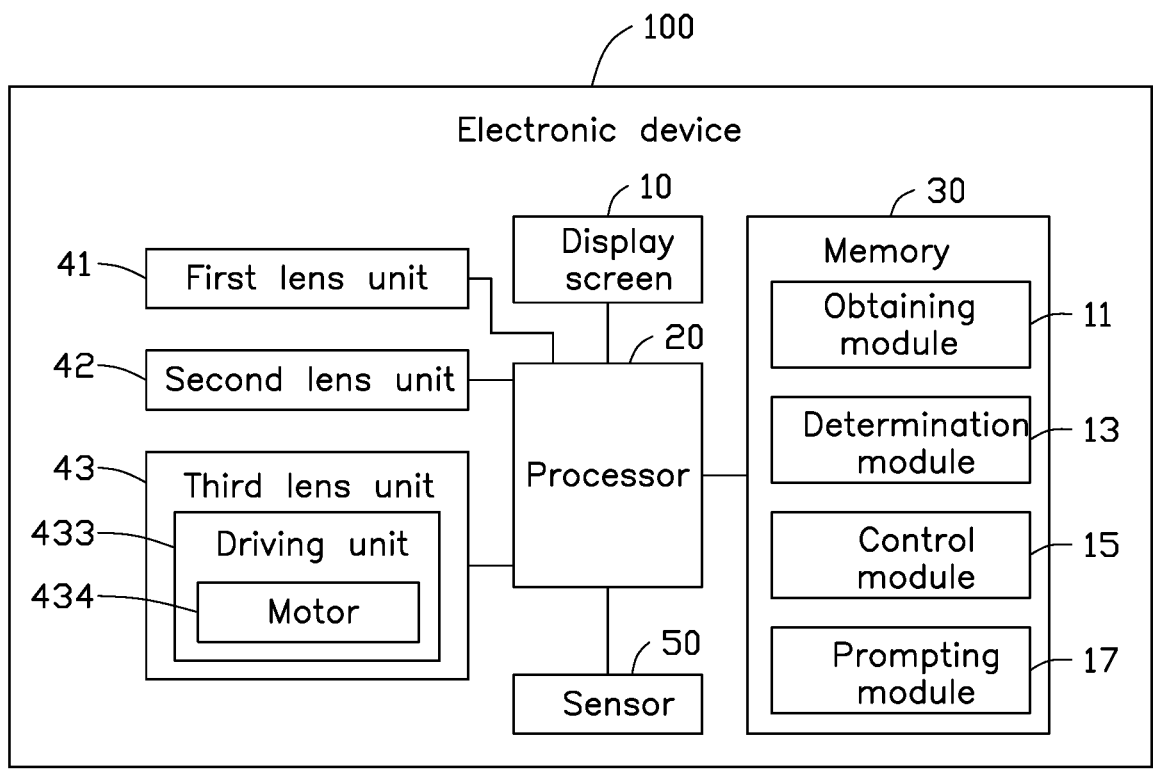
FIG. 1 is a block diagram of an electronic device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a block diagram of an electronic device 100 according to an embodiment of the present disclosure. In this embodiment, the electronic device 100 includes, but is not limited to, a display screen 10, a processor 20, a memory 30, a first lens unit 41, a second lens unit 42, a third lens unit 43, and a sensor 50. The memory 30 stores a plurality of modules, and the plurality of modules are executed by the processor 20. The electronic device 100 may be, but is not limited to, a tablet computer, a smart phone, or a personal digital processing device (PDA). The electronic device 100 may further include a headphone port, a universal serial bus (USB) port, a connector, and the like. The connector may be a USB connector, a headphone jack connector, or another type of connector.

The display screen 10 is positioned on a first surface of the electronic device 100. The display screen 10 is configured to provide an interactive interface and detect operations of the user performed thereon.

The processor 20 may be a central processing unit (CPU), a microprocessor, or other chips having a data processing function.

The memory 30 can be an internal memory of the electronic device 100 or an external memory, such as a smart memory card (SMC), a secure digital (SD) card, a flash card, and the like.

Figure 2:
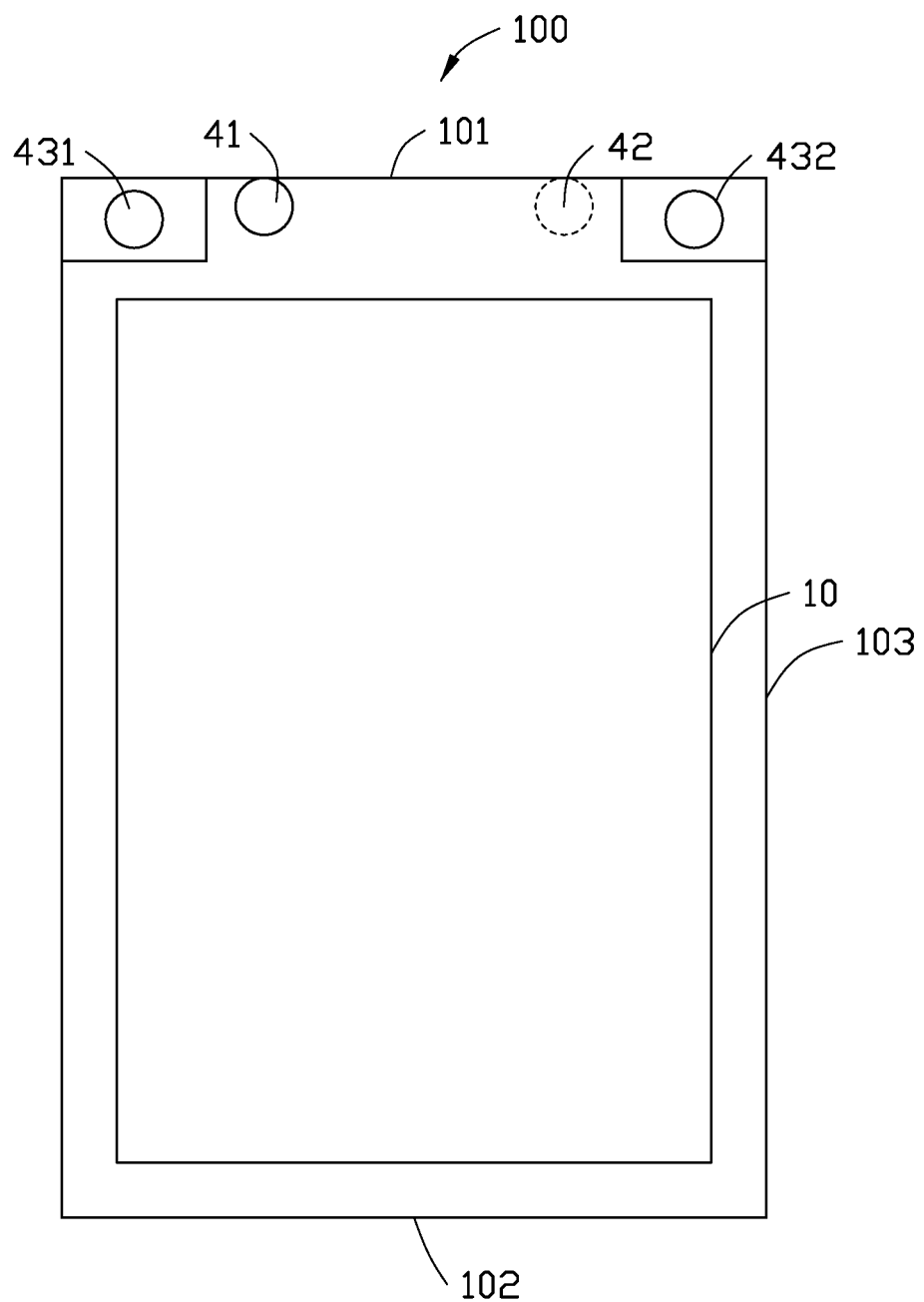
FIG. 2 is an isometric view of the electronic device of FIG. 1.

As illustrated in FIG. 2, the first lens unit 41 is positioned on the first surface of the electronic device 100 on which the display screen 10 is mounted. The second lens unit 42 is positioned on a second surface of the electronic device 100. The second surface is opposite to the first surface. The third lens unit 43 is positioned between the first surface and the second surface on the electronic device 100 so as to rotate. The third lens unit 43 is configured to cooperate with the first lens unit 41 and the second lens unit 42 to implement a multi-lens shooting mode.

The third lens unit 43 includes at least one lens and a driving unit 433. The driving unit 433 is configured to drive the third lens unit 43 to rotate. The driving unit 433 includes at least one motor (not shown) for driving the at least one lens to rotate. In this embodiment, the third lens unit 43 includes a first rotating lens 431 and a second rotating lens 432. The driving unit 433 includes two motors. One of the two motors drives the first rotating lens 431 to rotate. The other one of the two motors drives the second rotating lens 432 to rotate.

In this embodiment, the electronic device 100 includes a top wall 101, a bottom wall 102, and two sidewalls 103. The top wall 101, the bottom wall 102, and the two sidewalls 103 cooperatively form a rectangular frame. In this embodiment, opposite ends of the top wall 101 each define an opening (not labeled). The first rotating lens 431 is positioned at one opening of the top wall 101. The second rotating lens 432 is positioned at the other opening of the top wall 101.

In one embodiment, the first lens unit 41 is positioned at one side of the top wall 101 adjacent to the first rotating lens 431. The second lens unit 42 is positioned at one side of the top wall 101 adjacent to the second rotating lens 432. In other embodiments, the first lens unit 41 can be positioned at one side of the top wall 101 adjacent to the second rotating lens 432 or positioned at a middle of the top wall 101. The second lens unit 42 can be positioned at one side of the top wall 101 adjacent to the first rotating lens 431 or positioned at the middle of the top wall 101.

In this embodiment, each of the first and second rotating lenses 431 and 432 can rotate to one of a first direction, a second direction, and a third direction. The first direction can be same as the direction of the first lens unit 41. That is, the first rotating lens 431 and the second rotating lens 432 can rotate to same direction as that of the first lens unit 41, for example, forward. The second direction can be same as the direction of the second lens unit 42. That is, the first rotating lens 431 and the second rotating lens 432 can rotate to same direction as that of the second lens unit 42, for example, backward. The third direction is perpendicular to the first direction and the second direction. That is, the first rotating lens 431 and the second rotating lens 432 can rotate to a direction which is at 90 degrees from the direction of the first lens unit 41 or the second lens unit 42, for example, either left or right.

It can be understood that the first rotating lens 431 and the second rotating lens 432 are at opposite sides of the top wall 101. Therefore, the third direction of the first rotating lens 431 is opposite to the third direction of the second rotating lens 432. For example, if the third direction of the first rotating lens 431 is due left, the third direction of the second rotating lens 432 is due right. The first rotating lens 431 and the second rotating lens 432 can rotate to directions different from that of the first lens unit 41 and the second lens unit 42.

The first lens unit 41, the second lens unit 42, and the third lens unit 43 may be various lens types, for example, they may be black and white lenses, color lenses, standard lenses, wide-angle lenses, or telephoto lenses. By selecting at least one of the first lens unit 41, the second lens unit 42, and the third lens unit 43, and using different lens types, different shooting effects can be achieved.

For example, in one embodiment, when the user takes a selfie, the first lens unit 41 is selected and the first rotating lens 431 and/or the second rotating lens 432 can be rotated to the first direction for taking a picture with the first lens unit 41. A first picture is taken by the first lens unit 41, and a second picture is taken by the first rotating lens 431 and/or the second rotating lens 432. A synthesis module (not shown) may synthesize the first picture and the second picture into a third picture, so that the third picture has better clarity and definition than the first picture and the second picture.

Specifically, the synthesis module is a program module stored in the memory 30. The processor 20 executes the synthesis module to synthesize the first picture and the second picture into the third picture through an algorithm. For example, the first lens unit 41 is configured as the telephoto lens, the first rotating lens 431 and the second rotating lens 432 are configured as the wide-angle lenses. Then, the first picture taken by the first lens unit 41 has a clear foreground but a blurred background. The second picture taken by the first rotating lens 431 and the second rotating lens 432 has a clear background but a blurred foreground. The processor 20 executes the synthesis module to synthesize the foreground of the first picture and the background of the second picture to form the third picture with a clear foreground and with a clear background. It can be understood that the foreground may contain a person, an animal, or an object.

In a second embodiment, when the user takes other picture, the second lens unit 42 is selected and the first rotating lens 431 and/or the second rotating lens 432 can be rotated to the second direction for taking a picture with the second lens unit 42. A fourth picture is taken by the second lens unit 42, and a fifth picture is taken by the first rotating lens 431 and/or the second rotating lens 432. The processor 20 executes the synthesis module to synthesize the fourth picture and the fifth picture into a sixth picture through the algorithm. Compared with the fourth picture and the fifth picture, the sixth picture has better detail and coloration. For example, the second lens unit 42 is configured as the black and white lens, and the first rotating lens 431 and the second rotating lens 432 are configured as the color lenses. Then, the fourth picture taken by the second lens unit 42 has detail in bright and dark but no colors. The fifth picture is rich in color but detail in bright and dark details is not clear. The processor 20 executes the synthesis module to synthesize the detail in bright and dark of the fourth picture with the colors of the fifth picture to form the sixth picture with clear and color-rich bright and dark details.

In a third embodiment, when the user takes a panoramic image, the first rotating lens 431 is turned to the left and the second rotating lens 432 is turned to the right. At this time, the respective directions of the first lens unit 41, the second lens unit 42, the first rotating lens 431, and the second rotating lens 432 are forward, backward, left, and right. If the user requires, a 360-degrees panoramic image can be directly taken.

In other embodiment, a panoramic image which does not show the user can be taken, by the user lifting the electronic device 100 above head height or rotating the electronic device 100 to left/right directions for certain angles to capture a 360-degrees panoramic image. It can be understood that when capturing a panoramic image, different shots or lenses can also be used to achieve different shooting effects.

The sensor 50 is configured to detect whether the electronic device 100 is moving and generate a detection signal accordingly to the processor 20. The sensor 50 may be a barometric pressure sensor, a gravity sensor, an acceleration sensor, a gyroscope, or an electronic compass. The barometric pressure sensor may determine whether the electronic device 100 is moving up or moving down stairs, and moving uphill, by sensing whether an air pressure around the electronic device 100 changes. The gravity sensor may be used to determine whether the electronic device 100 is moving through sensing a change of gravity in the electronic device 100.

The modules include an obtaining module 11, a determination module 13, a control module 15, and a prompting module 17.

The obtaining module 11 is configured to obtain an instant state of the electronic device 100, a current location of the electronic device 100, and a biological characteristic of the user. The obtaining module 11 obtains the instant state of the electronic device 100 according to the detection signal. The instant state may be a current state of the electronic device 100. The current state may be a moving state or a stationary state. The moving state is related to an action of the user using the electronic device 100. If the user is moving up or moving down stairs, moving uphill, or moving downhill, the moving state of the electronic device 100 may be moving up or moving down stairs, moving uphill, or moving downhill.

In one embodiment, the obtaining module 11 may obtain the current location of the electronic device 100 through a positioning module (not shown). The positioning module may be a Global Positioning System (GPS) module. The electronic device 100 has mapping information. The positioning module may determine the current location of the electronic device 100 in combination with the mapping information. The obtaining module 11 may obtain a biological characteristic of the user through the first lens unit 41. The biological characteristic may be a facial feature or a feature of an iris of the eyes of the user.

The determination module 13 is configured to determine whether the instant state matches a preset state and determine whether the biological characteristic of the user is successfully acquired. In this embodiment, the preset state is that the electronic device 100 is in the moving state. The determination module 13 is further configured to determine whether the current location of the electronic device 100 matches a preset location. In this embodiment, the preset location may be, for example, a road intersection, an alley, or other dangerous road sections. The control module 15 is configured to control the first lens unit 41 to be turned on when the instant state matches the preset state, so as to capture a biological characteristic of the user.

In one embodiment, the control module 15 is further configured to control the electronic device 100 to operate in the panoramic image mode when the instant state matches the preset state and the biological characteristic of the user is successfully obtained. The panoramic image mode enables continuously shooting the 360-degrees panoramic image. It can be understood that the control module 15 controls the first lens unit 41, the second lens unit 42, and the third lens unit 43 to be turned on when the instant state matches the preset state and the biological characteristic of the user is successfully obtained. The control module 15 further controls the first rotating lens 431 to rotate to the left and the fourth rotating lens 432 to rotate to the right, thereby controlling the electronic device 100 to operate in the panoramic image mode.

In another embodiment, the control module 15 is configured to control the electronic device 100 to operate in the panoramic image mode when the instant state matches the preset state, the biological characteristic of the user is successfully obtained, and the electronic device 100 is in the preset location.

The prompting module 17 is configured to output a prompting message. The prompting module 17 may output the prompting message in combination with a driving device (not shown). The prompting message may be vibration, and the driving device may be two motors. Each of the two motors is positioned at the relative position of the opposite sidewalls 103 of the electronic device 100. The user can distinguish which side of the two opposite sidewalls 103 is dangerous based on the vibration of the motor. For example, the sidewalls 103 includes a left wall (not shown) and a right wall (not shown). If the motor on the left wall vibrates, the user can determine that the danger comes from the left side. If the motor on the right wall vibrates, the user can determine that the danger comes from the right side.

It can be understood that the prompting module 17 may also output the prompting message in combination with a flash (not shown). The prompting message may be a blinking signal. The prompting message may also be a voice message, a text message, or directly turning off the display screen 10.

Figure 3:
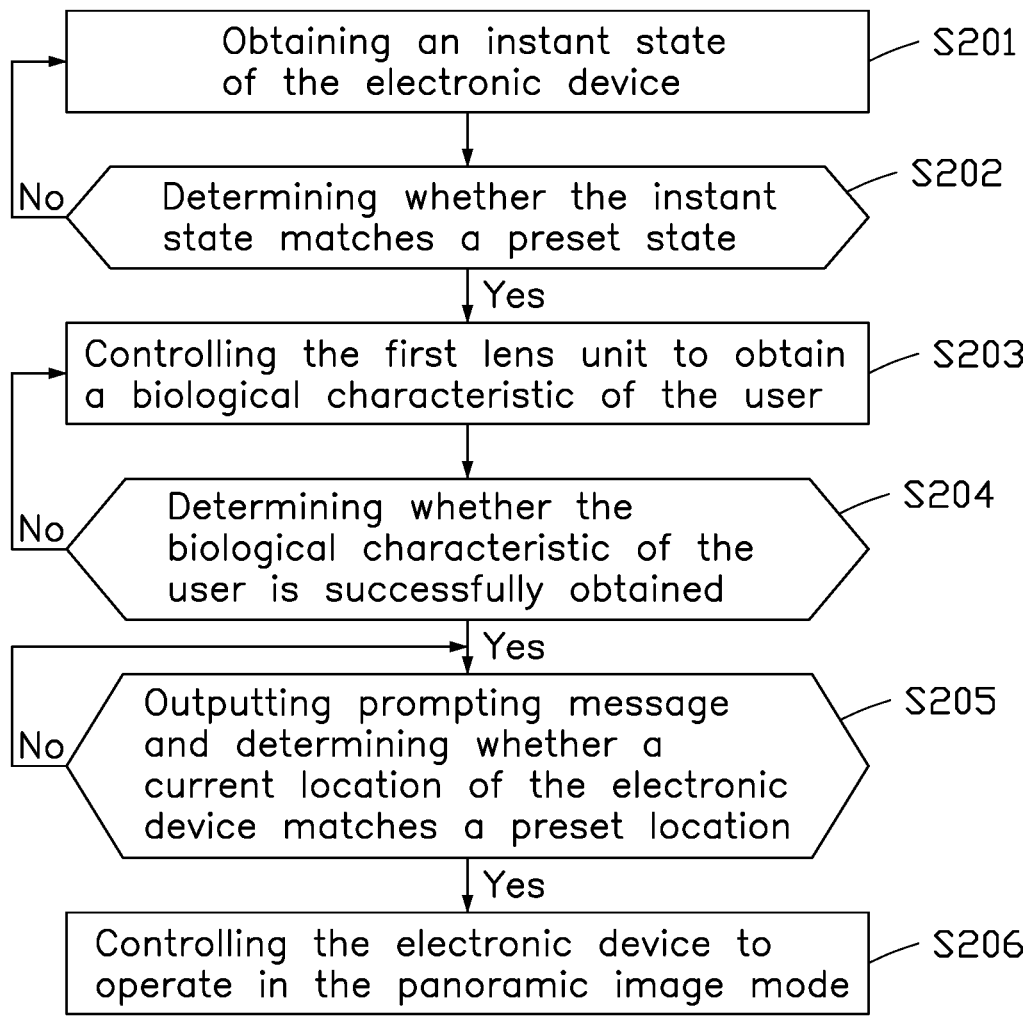
FIG. 3 is a flowchart of a control method applied to the electronic device of FIG. 1 in one embodiment.

The modules referred to in this disclosure may be an instruction groups that perform a specific function, and is more suitable than a program to describe the execution process of software in the electronic device 100. Functions of each module are illustrated in FIG. 3.

The method is provided by way of example, as there are a variety of ways to carry out the method. Each block shown in FIG. 3 represents one or more processes, methods, or subroutines which are carried out in the example method. Furthermore, the order of blocks is illustrative only and additional blocks can be added or fewer blocks may be utilized without departing from the scope of this disclosure.

At block S201, the obtaining module 11 obtains an instant state of the electronic device 100.

In this embodiment, the instant state is a current state where the electronic device 100 is in a moving state or a stationary state. The sensor 50 detects a current state of the electronic device 100, generates a detection signal, and transmits the detection signal to the processor 20. The obtaining module 11 obtains the instant state of the electronic device 100.

At block S202, the determination module 13 determines whether the instant state matches a preset state. If the determination module 13 determines that the instant state matches the preset state, the process proceeds to block S203. If the determination module 13 determines that the instant state does not match the preset state, the process returns to block S201.

The preset state is that the electronic device 100 is in a moving state. If the instant state is in a moving state, the determination module 13 determines that the instant state meets the preset state. If the instant state is in a stationary state, the determination module 13 determines that the instant state does not meet the preset state.

At block S203, the control module 15 controls the first lens unit 41 to obtain a biological characteristic of the user.

At block S204, the determination module 13 determines whether the biological characteristic of the user is successfully obtained. If the determination module 13 determines that the user's biological characteristic is successfully obtained, the process proceeds to block S205. If the determination module 13 determines that the user's biological characteristic is not obtained, the process returns to block S203.

In this embodiment, the biological characteristic may be any biological characteristic of a user. That is, as long as the obtaining module 11 obtains any biological characteristic of any user, such as a facial feature or a feature of an iris of the eyes of the user, the determination module 13 determines that the biological characteristic of the user is successfully obtained. If the obtaining module 11 does not obtain any biological characteristic of any user, the determination module 13 determines that the biological characteristic of the user is not obtained.

At block S205, the prompting module 17 outputs a prompting message and the determination module 13 determines whether the current location of the electronic device 100 matches a preset location. If the determination module 13 determines that the current location of the electronic device 100 matches the preset location, the process proceeds to block S206. If the determination module 13 determines that the current location of the electronic device 100 does not conform to the preset location, the process returns to block S205.

The prompting message may be a voice message or a text message for prompting the user that the user is in a dangerous state.

In this embodiment, the preset location may be a road intersection, an alley, or other dangerous road sections. If the current location of the electronic device 100 is an intersection, an alley, or other dangerous road sections, the determination module 13 determines that the current location of the electronic device 100 matches the preset location. If the current location of the electronic device 100 is not an intersection, an alley, or a dangerous road section, the determination module 13 determines that the current location of the electronic device 100 does not match the preset location.

At block S206, the control module 15 controls the electronic device 100 to operate in the panoramic image mode.

When the electronic device 100 captures a predetermined picture, the prompting module 17 outputs the prompting message again.

In this embodiment, when the instant state of the electronic device 100 matches the preset state, the user's biological characteristic is successfully obtained, and the current location of the electronic device 100 matches the preset location, the control module 15 controls the electronic device 100 to operate in the panoramic image mode. Otherwise, the electronic device 100 does not operate in the panoramic image mode for saving a power of the electronic device 100.

In the panoramic image mode, the first lens unit 41, the second lens unit 42, and the third lens unit 43 are all turned on, the first rotating lens 431 rotates to the left direction and the second rotating lens 432 rotates to the right direction.

In this embodiment, the predetermined picture may be an object approaching to the user or there is an obstacle in a predetermined location. When one the first lens unit 41, the second lens unit 42, the first rotating lens 431, and the second rotating lens 432 capture the predetermined picture, the prompting module 17 outputs the prompting message again.

The electronic device 100 includes a display screen 10, a first lens unit 41, a second lens unit 42, and a third lens unit 43. The first lens unit 41 and the second lens unit 42 are disposed on two opposite surfaces of the electronic device 100. The third lens unit 43 is rotatably disposed on the electronic device 100, which can implement a multi-lens shooting mode, thereby providing a comparative user experience.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An electronic device comprising:
   a display screen mounted on a first surface of the electronic device;
   a first lens unit positioned on the first surface of the electronic device;
   a second lens unit positioned on a second surface of the electronic device, the second surface being opposite to the first surface; and
   a third lens unit rotatably positioned between the first surface and the second surface on the electronic device, the third lens unit comprising a first rotating lens and a second rotating lens;
   wherein the third lens unit is operated in a multi-lens shooting mode with the first lens unit and the second lens unit, the first rotating lens is capable of rotating to one of a first direction, a second direction, and a third direction, and the second rotating lens is capable of rotating to one of a first direction, a second direction, and a fourth direction; the first direction is a direction of the first lens unit, the second direction is a direction of the second lens unit, the third direction and the fourth direction are perpendicular to the first direction and the second direction, and the third direction is opposite to the fourth direction.

2. The electronic device according to claim 1, wherein the third lens unit comprises at least one motor, and the third lens unit is rotated by the at least one motor.

3. The electronic device according to claim 1, further comprising:
   a processor;
   wherein the processor controls the first rotating lens to rotate to a direction different from directions of the first lens unit and the second lens unit and controls the second rotating lens to rotate to a direction opposite to the direction of the first rotating lens to operate in a panoramic image mode to take a 360-degrees panoramic image.

4. The electronic device according to claim 3, further comprising:
   a sensor configured to detect whether the electronic device is moving,
   wherein when the electronic device is detected to be moving, the processor further controls the first lens unit to obtain a biological characteristic of a user.

5. The electronic device according to claim 4,
   wherein the biological characteristic comprises a facial feature or an iris of the eyes of the user.

6. The electronic device according to claim 4,
   wherein when the biological characteristic of the user is obtained and the electronic device is at a preset location, the processor further controls the electronic device to operate in the panoramic image mode.

7. The electronic device according to claim 4,
   wherein the sensor is further configured to detect whether the electronic device is moving up or down.

8. The electronic device according to claim 6,
   wherein the preset location comprises a road intersection, an alley, or a dangerous road section.

9. The electronic device according to claim 6,
   wherein when the electronic device captures a predetermined picture in the panoramic image mode, the processor further controls the electronic device to output a prompting message, the predetermined picture comprises an object approaching to the user or there is an obstacle in a predetermined location.

10. A control method applied to an electronic device, the electronic device comprising:
    a first lens unit, a second lens unit, and a third lens unit, the first lens unit being on a first surface of the electronic device on which a display screen is mounted, the second lens unit being on a second surface of the electronic device, the second surface being opposite to the first surface, and the third lens unit being rotatably positioned between the first surface and the second surface on the electronic device, the third lens unit comprising a first rotating lens and a second rotating lens; the first rotating lens capable of rotating to one of a first direction, a second direction, and a third direction, and the second rotating lens capable of rotating to one of a first direction, a second direction, and a fourth direction; the first direction being a direction of the first lens unit, the second direction being a direction of the second lens unit, the third direction and the fourth direction being perpendicular to the first direction and the second direction, and the third direction being opposite to the fourth direction; the control method comprising:
    obtaining an instant state of the electronic device;
    determining whether the instant state matches a preset state;
    when the instant state matches the preset state, controlling the first lens unit to obtain a biological characteristic of a user; and outputting a prompting message when the biological characteristic of the user is obtained.

11. The control method according to claim 10, wherein the biological characteristic comprises a facial feature or an iris of the eyes of the user.

12. The control method according to claim 10, further comprising:

controlling the electronic device to operate in a panoramic image mode when the biological characteristic of the user is obtained and the electronic device is at a preset location.

13. The control method according to claim 10, further comprising:

controlling the electronic device to output a prompting message when the electronic device captured a predetermined picture, the predetermined picture comprises an object approaching to the user or there is an obstacle in a predetermined location.

14. The control method according to claim 10, further comprising:

detecting whether the electronic device is moving up or moving down stairs, and moving uphill or moving downhill; and when the electronic device is moving up or moving down stairs, and moving uphill or moving downhill, the instant state matches the preset state.

15. The control method according to claim 12, further comprising:

detecting whether the electronic device is at a road intersection, an alley, or a dangerous road section; and when the electronic device is at the road intersection or the alley, or a dangerous road section, the electronic device is at the preset location.

* * * * *